United States Patent [19]

Capriotti

[11] Patent Number: 4,550,132

[45] Date of Patent: Oct. 29, 1985

[54] PEROXIDE-CURABLE BROMINE-CONTAINING FLUOROELASTOMERS CONTAINING A SULFONE

[75] Inventor: Dante R. Capriotti, Cuyahoga Falls, Ohio

[73] Assignee: E. I. Du Pont de Nemours and Company, Wilmington, Del.

[21] Appl. No.: 590,838

[22] Filed: Mar. 19, 1984

[51] Int. Cl.[4] ............................................. C08K 5/45
[52] U.S. Cl. ...................................... 524/84; 524/545; 524/546
[58] Field of Search .................. 524/84, 167, 546, 545

[56] References Cited

U.S. PATENT DOCUMENTS

| | | | |
|---|---|---|---|
| 2,502,391 | 3/1950 | Ritterhausen et al. | 524/84 |
| 2,914,500 | 11/1959 | Barnhart et al. | 524/84 |
| 3,178,377 | 4/1965 | Raff | 524/84 |
| 3,192,231 | 6/1965 | Welcher | 524/84 |
| 3,884,877 | 5/1975 | Kolb | 260/47 |
| 4,028,302 | 6/1977 | Tynan | 524/167 |
| 4,035,565 | 7/1977 | Apotheker et al. | 526/249 |
| 4,214,060 | 7/1980 | Apotheker et al. | 525/387 |
| 4,233,421 | 11/1980 | Worm | 525/348 |
| 4,287,320 | 9/1981 | Kolb | 525/340 |
| 4,358,559 | 11/1982 | Holcomb et al. | 525/187 |

FOREIGN PATENT DOCUMENTS

| | | | |
|---|---|---|---|
| 702611 | 1/1965 | Canada | 524/167 |
| 0870653 | 5/1971 | Canada | 524/84 |
| 2758236 | 6/1979 | Fed. Rep. of Germany | 524/167 |
| 58-125739 | 7/1983 | Japan | 524/167 |

Primary Examiner—Joseph L. Schofer
Assistant Examiner—N. Sarofim

[57] ABSTRACT

A peroxide-curable fluoroelastomer composition comprising an elastomeric copolymer containing units derived from vinylidene fluoride, units derived from at least one other fluorine-containing monomer copolymerizable with vinylidene fluoride, said monomer being a compound which contains 2–7 carbon atoms, contains no bromine atom and contains at least as many fluorine atoms as carbon atoms, up to 3 mole percent, based on the total moles of copolymer, of a bromine-containing olefin with the proviso that enough of such olefin is present to provide at least about 0.05 weight percent bromine in the copolymer and about 0.5–5 parts per hundred parts elastomeric copolymer of tetramethylene sulfone.

7 Claims, No Drawings

PEROXIDE-CURABLE BROMINE-CONTAINING FLUOROELASTOMERS CONTAINING A SULFONE

BACKGROUND OF THE INVENTION

Peroxide-curable fluoroelastomers derived from units of vinylidene fluoride and a fluorine-containing monomer that is copolymerizable with vinylidene fluoride, such as hexafluoropropylene or pentafluoropropylene, optionally containing tetrafluoroethylene and up to 3 mole percent of units derived from a bromine-containing olefin can be peroxide cured to produce fluoroelastomers having good physical properties and exhibit good resistance to steam degradation. These fluoroelastomers that employ a bromine-containing olefin as a cure site ordinarily contain a processing aid; otherwise, it is not only difficult to remove the cured fluoroelastomer from the mold cavity, but it is frequently damaged when removed. Also, without processing aids it is difficult to obtain an extruded article having a smooth surface. However, processing aids have an adverse effect on the physical properties of the cured fluoroelastomer. Most significant changes are a reduction in tensile strength of the fluoroelastomer and a lessening of compression set resistance, a most important property of fluoroelastomers, especially when the elastomer is used as a gasket or O-ring. The present invention provides a fluoroelastomer composition comprising an elastomeric copolymer of vinylidene fluoride, a terminally ethylenically unsaturated fluoromonomer, a bromine-containing olefin, and a particular sulfone that functions as a processing aid in the peroxide-curable composition. The resulting fluoroelastomers have the advantages of similar compositions containing processing aids but, at the same time, the processing aid used in the present invention does not adversely affect the physical properties of the cured fluoroelastomer but quite surprisingly, actually maintains or improves the tensile strength and the compression set resistance of the fluoroelastomer at various temperatures.

SUMMARY OF THE INVENTION

It has now been discovered that an easily processible peroxide-curable fluoroelastomer composition can be obtained if a certain organic sulfone is added to the fluoroelastomer. More specifically, the present invention is directed to a peroxide-curable fluoroelastomer composition comprising an elastomeric copolymer comprising units derived from vinylidene fluoride, units derived from at least one other fluorine-containing monomer copolymerizable with vinylidene fluoride, said monomer being a compound which contains 2-7 carbon atoms, contains no bromine atoms, and contains at least as many fluorine atoms as carbon atoms, preferably hexafluoropropylene alone or with tetrafluoroethylene, and up to 3 mole percent, based on the total moles of copolymer, of units derived from a bromine-containing olefin with the proviso that enough of such olefin is present to provide at least 0.05 weight percent bromine in the copolymer and the fluoroelastomer composition contains about 0.5-5 parts, preferably about 1.5-2 parts, per hundred parts elastomeric copolymer of tetramethylene sulfone. The fluoroelastomer compositions are especially useful for the manufacture of O-rings, gaskets and tubing and similar articles where compression set resistance is an important requirement.

DETAILED DESCRIPTION OF THE INVENTION

The bromine-containing fluoroelastomer composition contains about 0.5-5 parts, preferably 1.5-2 parts, per hundred parts elastomeric copolymer of tetramethylene sulfone. When less than about 0.5 parts tetramethylene sulfone are used, a significant improvement in the processing of the polymer is not obtained and when more than about 5 parts are used, imperfections in the knit line of a molded part can occur. The presence of the tetramethylene sulfone in the bromine-containing fluoroelastomer is beneficial because it is soluble in the elastomer and, therefore, is easy to mill, the compounded elastomer extrudes smoothly, the flow properties of the elastomer are improved and the sulfone improves release of the elastomer from the mold. In addition, quite surprisingly, tetramethylene sulfone maintains or improves tensile strength, and compression set resistance of the fluoroelastomers.

The fluoroelastomer contains units derived from vinylidene fluoride. In addition to units of vinylidene fluoride, the fluoroelastomer copolymer contains units derived from at least one other fluorine-containing monomer copolymerizable with vinylidene fluoride, said monomer being a compound which contains 2-7 carbon atoms, contains no bromine atoms, and contains at least as many fluorine atoms as carbon atoms. Representative monomers include hexafluoropropylene, pentafluoropropylene, tetrafluoroethylene and perfluoroalkylperfluorovinyl ether where the alkyl group contains 1-5 carbon atoms. Preferred combinations of fluoroelastomers include units from any one of the following two combinations: vinylidene fluoride and hexafluoropropylene or pentafluoropropylene and tetrafluoroethylene or vinylidene fluoride, tetrafluoroethylene and perfluoromethylperfluorovinyl ether. The fluoroelastomers that are generally used in this invention are fluoroelastomers containing at least about 30% by weight vinylidene fluoride units. Usually such fluoroelastomers contain about 30-60 weight percent vinylidene fluoride units, about 20-50 weight percent hexafluoropropylene units or pentafluoropropylene or perfluoromethyl perfluorovinyl ether units and about 3-35 weight percent tetrafluoroethylene units. The fluoroelastomers used in the process also contain units derived from a bromine-containing olefin. The term "bromine-containing olefin" as used herein means an olefin in which at least one hydrogen atom has been replaced with a bromine atom, and optionally one or more of the remaining hydrogen atoms have been replaced with an atom of another halogen, preferably fluorine. Some compounds of this type are available commercially and others can be prepared by methods known in the art, for example as shown by Tarrant and Tandon, 34 J. Org. Chem. 864 (1969) and by Fainberg and Miller, JACS 4170 (1957). Representative bromine-containing olefins which are copolymerizable with the monomers used to form the elastomeric copolymer include bromotrifluoroethylene, 4-bromo-3,3,4,4- tetrafluorobutene-1, vinyl bromide, 1-bromo-2,2-difluoroethylene, perfluoroallylbromide, 4-bromo-1,1,2-trifluorobutene, 4-bromo-1,1,3,3,4,4-hexafluorobutene, 4-bromo-3-chloro-1,1,3,4,4-pentafluorobutene, 6-bromo-5,5,6,6-tetrafluorohexene, 4-bromoperfluorobutene-1, and 3,3-difluoroallylbromide. It is preferably to use sufficient units of the brominated olefin to provide about 0.3-1.5 weight percent bromine in the elastomeric copolymer.

Bromine-containing fluoroelastomers used in this invention are further described in U.S. Pat. No. 4,214,060, the disclosure of which is incorporated herein by reference.

In preparing the fluoroelastomer to be used in the present composition, it is preferred that the reaction mixture of monomer components also contains a free-radical initiator, and the copolymer-forming reaction is carried out as a free radical emulsion polymerization reaction. Among the most useful free-radical initiators to use in such a reaction are ammonium persulfate, sodium persulfate, potassium persulfate, or a mixture of two or more such compounds. Also useful are other water-soluble inorganic peroxide compounds, for example, sodium, potassium and ammonium perphosphates, perborates, and percarbonates. The initiator can be used in combination with a reducing agent such as sodium, potassium, or ammonium sulfite, bisulfite, metabisulfite, hyposulfite, thiosulfate, phosphite, or hypophosphite, or in combination with a ferrous, cuprous, or silver salt, or other easily oxidized metal compound. Known organic free-radical initiators can also be used, preferably in combination with a suitable surfactant such as sodium lauryl sulfate or ammonium perfluorooctanoate. The surfactant can be selected from those known to be useful in the manufacture of fluoroelastomer. A surfactant can of course also be present when using an inorganic initiator. Optionally, a suitable known chain transfer agent can also be present during the emulsion polymerization reaction.

After completion of the emulsion polymerization reaction, the copolymer can be isolated from the resulting polymer latex by known methods, for example by coagulation by adding an electrolyte or by freezing, followed by centrifuging or filtering and then drying the copolymer.

During preparation of the copolymer, the reaction mixture is preferably heated in a reactor which has been flushed with an inert gas at about 50° C.–130° C. under superatmospheric pressure, for example under a pressure of about 7–140 kg/cm$^2$, preferably about 35–105 kg/cm$^2$. In some of the most useful procedures, the polymerization is carried out as a continuous process and the reaction mixture has an average residence time in the reactor of about 5 to 30 minutes in some cases and up to 2 or 3 hours in others. Residence time can be calculated by dividing the reactor volume by the volume of latex produced per hour.

The fluoroelastomer used in the process of this invention in the majority of cases will have an inherent viscosity of about 0.01 dl/g or higher, with special preference for an inherent viscosity of about 0.2–1.2 dl/g. Inherent viscosity of the fluoroelastomers can be measured at 30° C. at a copolymer concentration of 0.1% by weight in a solvent composed of 87% by volume of tetrahydrofuran and 13% by volume of N,N-dimethylformamide.

Usually, a coagent which is a polyunsaturated compound that cooperates with a peroxide curing agent is blended with the fluoroelastomer composition. The coagent is usually added to the fluoroelastomer in an amount of about 0.5–10%, preferably about 1–7%, by weight of the copolymer content. Representative coagents known in the art include triallyl cyanurate, triallylisocyanurate, tris(diallylamine)-s-triazine, triallyl phosphite, N,N-diallyl acrylamide, hexa-allylphosphoramide, N,N,N',N'-tetra-allyl terephthalamide, N,N,N',N'-tetra-allyl malonamide, trivinyl isocyanurate, 2,4,6-trivinyl methyltrisiloxane, tri-(5-norbornene-2-methylene) cyanurate and similar compounds.

The fluoroelastomer compositions also contain a conventional acid acceptor that is a divalent metal oxide or divalent metal hydroxide, such as the oxides or hydroxides of magnesium, zinc, calcium or lead; or a mixture of the oxide and/or hydroxide with a metal salt of a weak acid, for example, a mixture containing about 1-20 percent by weight of the metal salt. Among the useful metal salts of weak acids are barium-, sodium-, potassium-, lead-, and calcium-/-stearate, -benzoate, -carbonate, -oxalate, and -phosphite. The amount of the metal compound added to the elastomeric copolymer generally is about 1–15 parts by weight per 100 parts of copolymer, about 2–10 parts being preferred. The metal compound concentration to some extent affects the rate of cure, and below the preferred range the cure rate is decreased. Above the preferred range, the elastic properties of a cured fluoroelastomer are gradually impaired and it is, therefore, advantageous not to exceed the preferred range of the metal compound.

The metal compound serves a dual purpose. It absorbs certain gaseous and acidic materials which are evolved during vulcanization and can chemically attack and weaken the fluoroelastomer. It also provides a long term aging stability. The metal oxide can be compounded with a fluoroelastomer stock either free or as a metal oxide complex or chelate with organic complexing agents and ligands, such as cyclic polyethers, amines, phosphines, ketones, alcohols, phenols, or carboxylic acids.

The fluoroelastomer compositions of the present invention can optionally contain other compounding agents such as carbon black, silica, clay, kieselguhr, talc, coloring agents and the like.

The bromine-containing fluoroelastomer to which the sulfone has been added is cured with an organic peroxide, usually a dialkyl peroxide. An organic peroxide is selected which will function as a curing agent for the composition in the presence of the other ingredients which are to be present in the end-use composition and under the temperature to be used in the curing operation without causing any harmful amount of curing during mixing and other operations that precede the curing operation.

A dialkyl peroxide that decomposes at a temperature above about 50° C. is preferred when the composition is to be subjected to processing at elevated temperatures before it is cured. Useful peroxide curing agents include 2,5-dimethyl-2,5-di(tertiarybutylperoxy) hexyne-3 and 2,5-dimethyl-2,5,-di(tertiarybutylperoxy) hexane, dicumyl peroxide, dibenzoyl peroxide, tertiary butyl perbenzoate and di[1,3-dimethyl-3-(t-butylperoxy)butyl] carbonate.

EXAMPLE

A peroxide-curable elastomeric compolymer comprising 35% by weight vinylidene fluoride, 34.2% by weight hexafluoropropylene, 29% by weight tetrafluoroethylene and 0.8 mole % of the brominated olefin 4-bromo-3,3,4,4- tetrafluorobutene-1, (0.7 weight % bromine in the copolymer) lead oxide, MT carbon black and the sulfone processing aids is prepared in the amounts given in the following Table. These ingredients are intimately mixed with a peroxide curative at a temperature of about 104° C. on an internal mixer for 5 minutes.

The resulting compounded peroxide curable fluoroelastomer copolymer is press cured by heating the compounded mixture to a temperature of 177° C. for 10 minutes. The precured compounded mixture is then post cured in an oven at a temperature of 232° C. for 16 hours.

A control run without any processing aid and three additional runs described in comparative examples A, B and C with chemically similar processing aids are prepared to show the advantages of the invention illustrated in the example.

The ingredients used and amounts are given in the following Table. Physical properties of the cured fluoroelastomer copolymer composition are measured according to conventional ASTM tests indicated in the Table.

TABLE

|  | Control | Ex. 1 | COMPARATIVE EXAMPLES | | |
|---|---|---|---|---|---|
|  |  |  | A | B | C |
| Fluoroelastomer | 100.0 | 100.0 | 100.0 | 100.0 | 100.0 |
| Triallylisocyanurate | 3.0 | 3.0 | 3.0 | 3.0 | 3.0 |
| Lead Oxide | 3.8 | 3.8 | 3.8 | 3.8 | 3.8 |
| MT Carbon Black | 30.0 | 30.0 | 30.0 | 30.0 | 30.0 |
| Luperco 101XL* | 3.0 | 3.0 | 3.0 | 3.0 | 3.0 |
| Tetramethylene Sulfone |  | 1.5 |  |  |  |
| 4,4'-Dichlorodiphenyl Sulfone |  |  | 1.5 |  |  |
| Dimethyl Sulfone |  |  |  | 1.5 |  |
| Tetramethylene Sulfoxide |  |  |  |  | 1.5 |

*45% 2,5-dimethyl-2,5-di(tertiarybutylperoxy)hexane and 55% inert filler.

Press-Cure 10 minutes at 177° C. followed by 16 hours Post-Cure at 232° C. and tested for stress strain properties.

| STRESS STRAIN PROPERTIES (ASTM D-412) | | | | | |
|---|---|---|---|---|---|
| Tensile Strength (MPa) | 19.2 | 20.2 | 21.0 | 18.7 | 19.9 |
| 100% Modulus (MPa) | 7.8 | 8.1 | 7.7 | 7.9 | 7.2 |
| Elongation at Break (%) | 190 | 185 | 200 | 180 | 200 |

The following data show the compression set values and percent improvement relative to the control.

| Compression Set, Method B ASTM D-395 - % | CON- TROL | 1 | COMPARATIVE EXAMPLES | | |
|---|---|---|---|---|---|
|  |  |  | A | B | C |
| 70 hours at 30° C.- Pellets | 100.3 | 100.3 | 97.3 | 99.9 | 98.2 |
| % improvement relative to control | — | 0 | +3.0 | 0 | +2.1 |
| 70 hours at 30° C. - O-Rings | 98.5 | 88.5 | 87.1 | 97.0 | 95.5 |
| % improvement relative to control | — | +10.2 | +11.6 | +1.5 | +3.1 |
| 70 hours at room temperature- Pellets | 21.3 | 17.0 | 20.9 | 19.3 | 19.2 |
| % improvement relative to control | — | +20.2 | +1.9 | +9.4 | +9.9 |
| 70 hours at room temperature- O-Rings | 14.2 | 14.2 | 17.1 | 17.6 | 17.6 |
| % improvement relative to control | — | 0 | −20 | −23.9 | −23.9 |
| 70 hours at 200° C. - Pellets | 36.4 | 32.8 | 36.9 | 35.8 | 39.9 |
| % improvement relative to control | — | +9.9 | −1.4 | +1.6 | −9.6 |
| 70 hours at 200° C. - O-Rings | 44.2 | 42.8 | 45.7 | 52.9 | 55.6 |
| % improvement relatvie to control | — | +3.2 | −3.4 | −19.7 | −25.8 |

I claim:

1. In a peroxide-curable fluoroelastomer composition comprising an elastomeric copolymer containing units derived from vinylidene fluoride, units derived from at least one other fluorine-containing monomer copolymerizable with vinylidene fluoride, said monomer being a compound which contains no bromine atom, and contains at least as many fluorine atoms as carbon atoms and up to 3 mole percent of units derived from a bromine-containing olefin, with the proviso that enough of such olefin is present to provide at least about 0.05 weight percent bromine in the copolymer, the improvement which comprises the fluoroelastomer composition contains about 0.5–5 parts per hundred parts elastomeric copolymer of tetramethylene sulfone.

2. A composition of claim 1 wherein from about 1.5–2 parts sulfone are incorporated in the elastomeric copolymer.

3. A composition of claim 1 wherein the fluorine-containing monomer is derived from units of hexafluoropropylene.

4. A composition of claim 3 wherein the fluorine-containing monomer is derived from units of tetrafluoroethylene.

5. A composition of claim 3 wherein units of the bromine-containing olefin are derived from 4-bromo-3,3,4,4-tetrafluorobutene-1.

6. A composition of claim 1 containing about 1-15 parts by weight per 100 parts copolymer of a divalent metal oxide or divalent metal hydroxide acid acceptor.

7. A composition of claim 1 wherein the fluoroelastomer contains about 30-60 weight percent vinylidine fluoride units.

* * * * *